(12) United States Patent
Behrangrad

(10) Patent No.: US 9,746,836 B2
(45) Date of Patent: Aug. 29, 2017

(54) SUPPLY AND DEMAND CONTROL DEVICE AND SUPPLY AND DEMAND CONTROL METHOD

(71) Applicant: Panasonic Corporation, Osaka (JP)

(72) Inventor: Mahdi Behrangrad, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 500 days.

(21) Appl. No.: 14/380,979

(22) PCT Filed: Dec. 16, 2013

(86) PCT No.: PCT/JP2013/007387
§ 371 (c)(1),
(2) Date: Aug. 26, 2014

(87) PCT Pub. No.: WO2014/097608
PCT Pub. Date: Jun. 26, 2014

(65) Prior Publication Data
US 2015/0045974 A1 Feb. 12, 2015

(30) Foreign Application Priority Data

Dec. 18, 2012 (JP) .................................. 2012-276214

(51) Int. Cl.
*G05B 13/02* (2006.01)
*H02J 3/14* (2006.01)
(Continued)

(52) U.S. Cl.
CPC ............... *G05B 13/02* (2013.01); *G05F 1/66* (2013.01); *H02J 3/14* (2013.01); *H02J 3/24* (2013.01);
(Continued)

(58) Field of Classification Search
None
See application file for complete search history.

(56) References Cited

U.S. PATENT DOCUMENTS 5,664,205 A * 9/1997 O'Brien ................ G06F 1/3203
713/322
7,356,385 B2 4/2008 Lenarduzzi et al.
(Continued)

FOREIGN PATENT DOCUMENTS

EP 1 739 806 1/2007
JP 61-106027 5/1986
(Continued)

OTHER PUBLICATIONS

International Search Report issued Mar. 11, 2014 in International (PCT) Application No. PCT/JP2013/007387.
(Continued)

*Primary Examiner* — Tuan Dao
(74) *Attorney, Agent, or Firm* — Wenderoth, Lind & Ponack, L.L.P.

(57) ABSTRACT

A supply and demand control device includes: a first communication unit which communicates, via a communication network, with an electrical device which belongs to a customer and consumes power from a power system; and a control unit which obtains a frequency of the power system, and start observation control if the obtained frequency falls below a lower limit of a predetermined frequency range, in which in the observation control, the control unit determines start time for reducing power consumption by the electrical device via the first communication unit, based on a rate of change in frequency obtained after the observation control is started, and starts reducing the power consumption at the start time if the obtained frequency does not return to within the predetermined frequency range within an observation duration which is a duration from start of the observation control to the start time.

12 Claims, 12 Drawing Sheets

(51) Int. Cl.
*G05F 1/66* (2006.01)
*H02J 3/24* (2006.01)
*H02J 13/00* (2006.01)

(52) U.S. Cl.
CPC ....... *H02J 13/0006* (2013.01); *Y02B 70/3225* (2013.01); *Y02B 70/3266* (2013.01); *Y02E 60/74* (2013.01); *Y04S 10/30* (2013.01); *Y04S 20/222* (2013.01); *Y04S 20/224* (2013.01); *Y04S 20/242* (2013.01)

(56) References Cited

U.S. PATENT DOCUMENTS

| | | | | |
|---|---|---|---|---|
| 8,869,152 | B1* | 10/2014 | Abrishami | G06F 1/324 713/300 |
| 2009/0012916 | A1* | 1/2009 | Barnett | G06Q 50/06 705/412 |
| 2009/0299540 | A1 | 12/2009 | Abi-Samra | |
| 2010/0213763 | A1* | 8/2010 | Boss | H02J 3/14 307/29 |
| 2011/0077753 | A1 | 3/2011 | Edmunds | |
| 2011/0241892 | A1* | 10/2011 | Park | H01J 37/32174 340/658 |
| 2011/0245987 | A1* | 10/2011 | Pratt | H01M 10/44 700/295 |

FOREIGN PATENT DOCUMENTS

| | | |
|---|---|---|
| JP | 2001-103669 | 4/2001 |
| JP | 2011-19380 | 1/2011 |
| JP | 2011-135688 | 7/2011 |

OTHER PUBLICATIONS

European Search Report issued Dec. 8, 2015 in corresponding European patent application No. 13865129.4.

* cited by examiner

SUPPLY AND DEMAND CONTROL DEVICE AND SUPPLY AND DEMAND CONTROL METHOD

TECHNICAL FIELD

The present invention relates to, for example, a supply and demand control device for adjusting power supply and demand in a power system.

BACKGROUND ART

With expansion of smart grid, demand response (hereinafter, also referred to as "DR") control to adjust power supply and demand in a power system is drawing attention (e.g., Patent Literatures 1 and 2). In the DR control, a DR provider (general customer) controls electrical equipment based on a contract with a service aggregator, thereby stabilizing the power system.

Moreover, incentive (consideration) which the DR provider receives in the DR control is different depending on the accuracy of the DR control. Thus, a start time, an end time, and the amount of response in the DR control are important.

There are various types of DR control. For instance, information indicating, for example, a start time, an end time, and the amount of response in DR control is received from a service aggregator. The DR control is then performed in accordance with a received command. Such DR control is known.

CITATION LIST

Patent Literature

[PTL 1] U.S. patent application publication number 2011/0077753
[PTL 2] U.S. Pat. No. 7,356,385

SUMMARY OF INVENTION

DR providers need to construct a communications infrastructure to perform the above DR control. However, the construction of the communications infrastructure is expensive. Therefore, the construction of the communications infrastructure is a barrier to entering the DR control.

In view of the above problem, the present invention provides, for example, a supply and demand control device which can start the DR control at appropriate timing without using the communications infrastructure.

A supply and demand control device according to an aspect of the present invention is a supply and demand control device for controlling power supply and demand between a power system and a customer. The supply and demand control device includes: a first communication unit which communicates, via a communication network, with an electrical device which belongs to the customer and consumes power from the power system; and a control unit which obtains a frequency of the power system, and starts observation control if the obtained frequency falls below a lower limit of a predetermined permissible frequency range, in which in the observation control, the control unit determines start time for reducing power consumption by the electrical device via the first communication unit, based on a rate of change in frequency obtained after the observation control is started, and starts reducing the power consumption at the start time if the obtained frequency does not return to within the predetermined permissible frequency range within an observation duration which is a duration from start of the observation control to the start time.

It should be noted that general and specific aspect(s) disclosed above may be implemented using a system, a method, an integrated circuit, a computer program, or a computer-readable recording medium such as a CD-ROM, or any combination of systems, methods, integrated circuits, computer programs, or computer-readable recording media.

A supply and demand control device according to the present invention can start DR control at appropriate timing without using a communications infrastructure.

DESCRIPTION OF EMBODIMENTS (Underlying Knowledge Forming Basis of the Present Disclosure)

Figure 1:
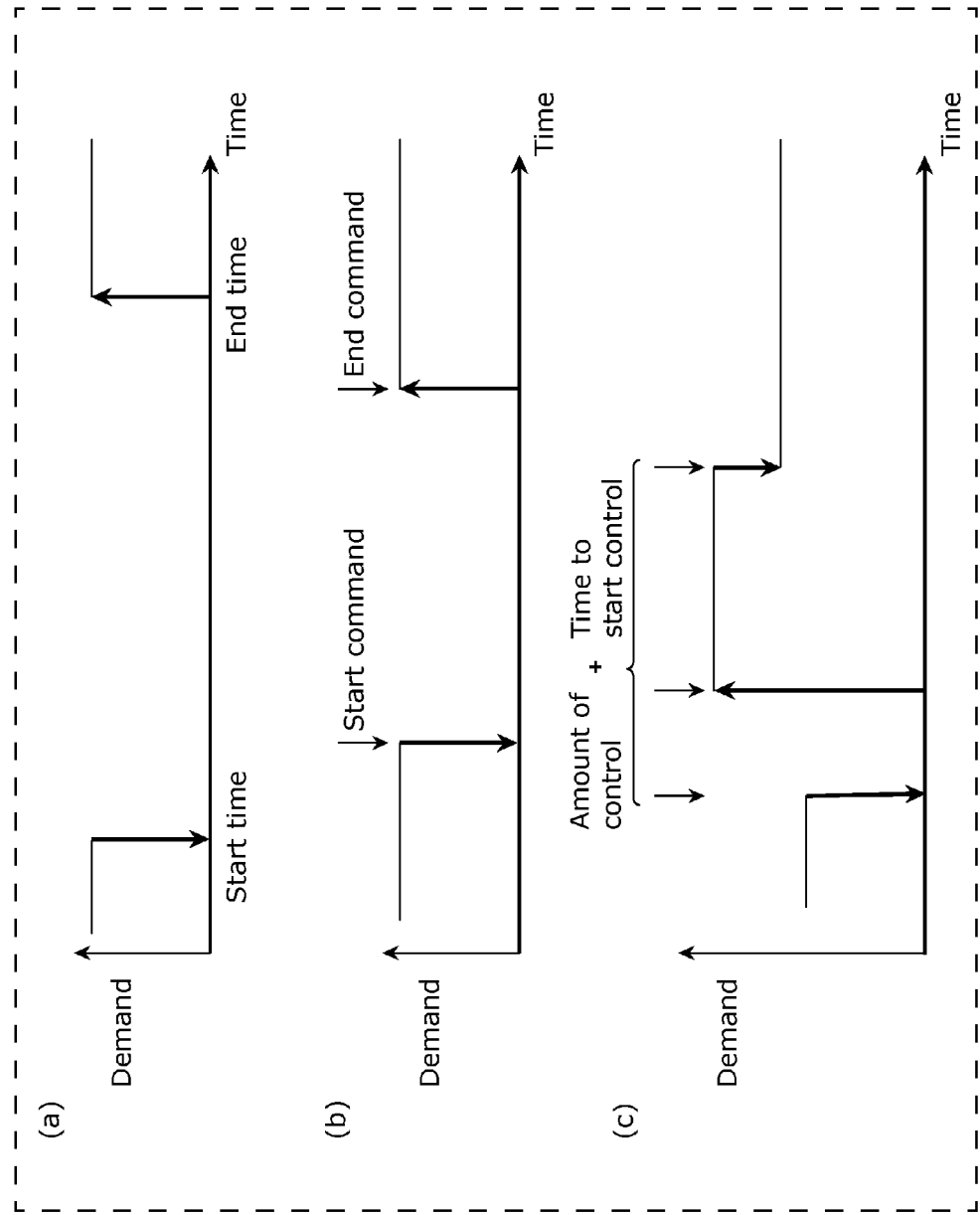
FIG. 1 is a figure for explaining the types of DR control.

As described in Background Art, DR control to adjust power supply and demand in a power system is gathering attention. There are various types of DR control. FIG. 1 is a figure for explaining the types of DR control.

(a) in FIG. 1 is a figure for explaining schedule-based DR control. The start time and end time of the schedule-based DR control are predetermined. The schedule-based DR control is represented by, for example, peak shaving control to reduce power consumption by an electrical device during a time when a power demand is high in a power system.

(b) in FIG. 1 is a figure for explaining order-based DR control. In the order-based DR control, the start time and end time of the DR control are not predetermined. The start time and end time of the DR control are determined based on commands (a start command and an end command) transmitted from a service aggregator. It should be noted that in the order-based DR control, a command other than the start and end commands is not transmitted basically. The order-based control is represented by, for example, DR control for supplying reserve.

(c) in FIG. 1 is a figure for explaining continuous type DR control. In the continuous type DR control, the amount of DR control and time to start DR control are periodically (continuously) instructed by a command (the amount of control+time to start control) transmitted from the service aggregator. The continuous type DR control is represented by, for example, FR control.

A communications infrastructure is necessary to perform DR control other than the schedule-based DR control. Moreover, satisfactory communication should be maintained between the server of a service aggregator and a DR controller (supply and demand control device) for performing the DR control.

When communication is cut off between the server of the service aggregator and the DR controller, the DR control may be interrupted. The interruption of the DR control due to communication failure may not only give an economic loss to the DR provider but also destabilize the power system.

Therefore, the inventor et al. has found a way of performing DR control corresponding to the above order-based control without using a communications infrastructure.

Specifically, a supply and demand control device according to an aspect of the present invention is a supply and demand control device for controlling power supply and demand between a power system and a customer. The supply and demand control device includes: a first communication unit which communicates, via a communication network, with an electrical device which belongs to the customer and consumes power from the power system; and a control unit which obtains a frequency of the power system, and starts observation control if the obtained frequency falls below a lower limit of a predetermined permissible frequency range, in which in the observation control, the control unit determines start time for reducing power consumption by the electrical device via the first communication unit, based on a rate of change in frequency obtained after the observation control is started, and starts reducing the power consumption at the start time if the obtained frequency does not return to within the predetermined permissible frequency range within an observation duration which is a duration from start of the observation control to the start time.

This allows the supply and demand control device to reduce the power consumption by the electrical device at appropriate timing, without using communications infrastructure. Moreover, according to the supply and demand control device, it is possible to suppress the risk of blackout or others due to an accident in the power system and reduce the possibility of unnecessary reduction in power consumption by the electrical device.

Moreover, the control unit may determine the start time to be an earlier time as the rate of change represents a more abrupt decrease in frequency.

Moreover, the observation duration may include a first observation duration and a second observation duration subsequent to the first observation duration, and the control unit may determine a length of the second observation duration, depending on a reference change rate, and determine an end time of the second observation duration to be the start time, the reference change rate being the rate of change between a frequency obtained at a start of the first observation duration and a frequency obtained at an end of the first observation duration.

Moreover, the control unit may determine the second observation duration to be a shorter duration as the reference change rate represents a more abrupt decrease in frequency.

Moreover, if a rate of change in frequency obtained during the second observation duration represents a more abrupt decrease in frequency than the reference change rate, the control unit may shorten the second observation duration.

Moreover, if the rate of change represents an increase in frequency, the control unit does not have to determine the start time or reduce the power consumption.

Moreover, the supply and demand control device may further include a second communication unit which communicates with a server, in which the control unit may (i) reduce the power consumption depending on a power supply and demand adjustment instruction which the second communication unit receives from the sever, and (ii) start the observation control if communication is cut off between the second communication unit and the sever and the obtained frequency falls below the lower limit of the predetermined permissible frequency range.

Moreover, if the obtained frequency returns to within the predetermined permissible frequency range within the observation duration, the control unit may cancel reduction of the power consumption scheduled to start at the start time.

Moreover, if the obtained frequency falls below a predetermined threshold within the observation duration, the predetermined threshold being less than the lower limit of the predetermined permissible frequency range, the control unit may further perform control in which the power consumption by the electrical device is reduced via the first communication unit, the control being different from the observation control.

Moreover, the supply and demand control device may further include a measurement unit which measures a frequency of the power system, in which the control unit may obtain the frequency of the power system measured by the measurement unit.

Moreover, a supply and demand control device according to an aspect of the present invention is a supply and demand control device for controlling power supply and demand between a power system and a customer. The supply and demand control device includes: a first communication unit which communicates, via a communication network, with an electrical device which belongs to the customer and consumes power from the power system; and a control unit which obtains a frequency of the power system, and starts observation control if the obtained frequency exceeds an upper limit of a predetermined permissible frequency range, in which in the observation control, the control unit determines start time for increasing power consumption by the electrical device via the first communication unit, based on a rate of change in frequency obtained after the observation control is started, and starts increasing the power consumption at the start time if the obtained frequency does not return to within the predetermined permissible frequency range within an observation duration which is a duration from start of the observation control to the start time.

Moreover, a supply and demand control device according to an aspect of the present invention is a supply and demand control device for controlling power supply and demand between a power system and a customer. The supply and demand control device includes: a first communication unit which communicates, via a communication network, with an electrical device which belongs to the customer and consumes power from the power system; and a control unit which controls the electrical device via the first communication unit, in which the control unit obtains a frequency of the power system, sets an observation duration of the frequency if the obtained frequency falls below a lower limit of a predetermined permissible frequency range, determines whether or not to reduce power consumption by the electrical device, depending on a rate of change in frequency obtained during the observation duration, and if the rate of change is likely to return to within the permissible frequency range, suspend reduction of the power consumption by the electrical device, and if the rate of change represents a decrease in frequency, starts reducing the power consumption by the electrical device at an end time of the observation duration.

It should be noted that general and specific aspect(s) disclosed above may be implemented using a system, a method, an integrated circuit, a computer program, or a computer-readable recording medium such as a CD-ROM, or any combination of systems, methods, integrated circuits, computer programs, or recording media.

Embodiments will be described in detail with reference to the drawings.

It should be noted that each of the embodiments described below illustrates a general or specific example. Numerical values, shapes, materials, structural elements, the arrangement and connection of the structural elements, steps, the order of the steps, and others indicated in the following embodiments are mere examples, and are not intended to limit the present invention. Moreover, among the structural elements in the following embodiments, the structural elements not recited in the independent claims are described as optional structural elements.

Embodiment 1

[Overall Configuration]

Figure 2:
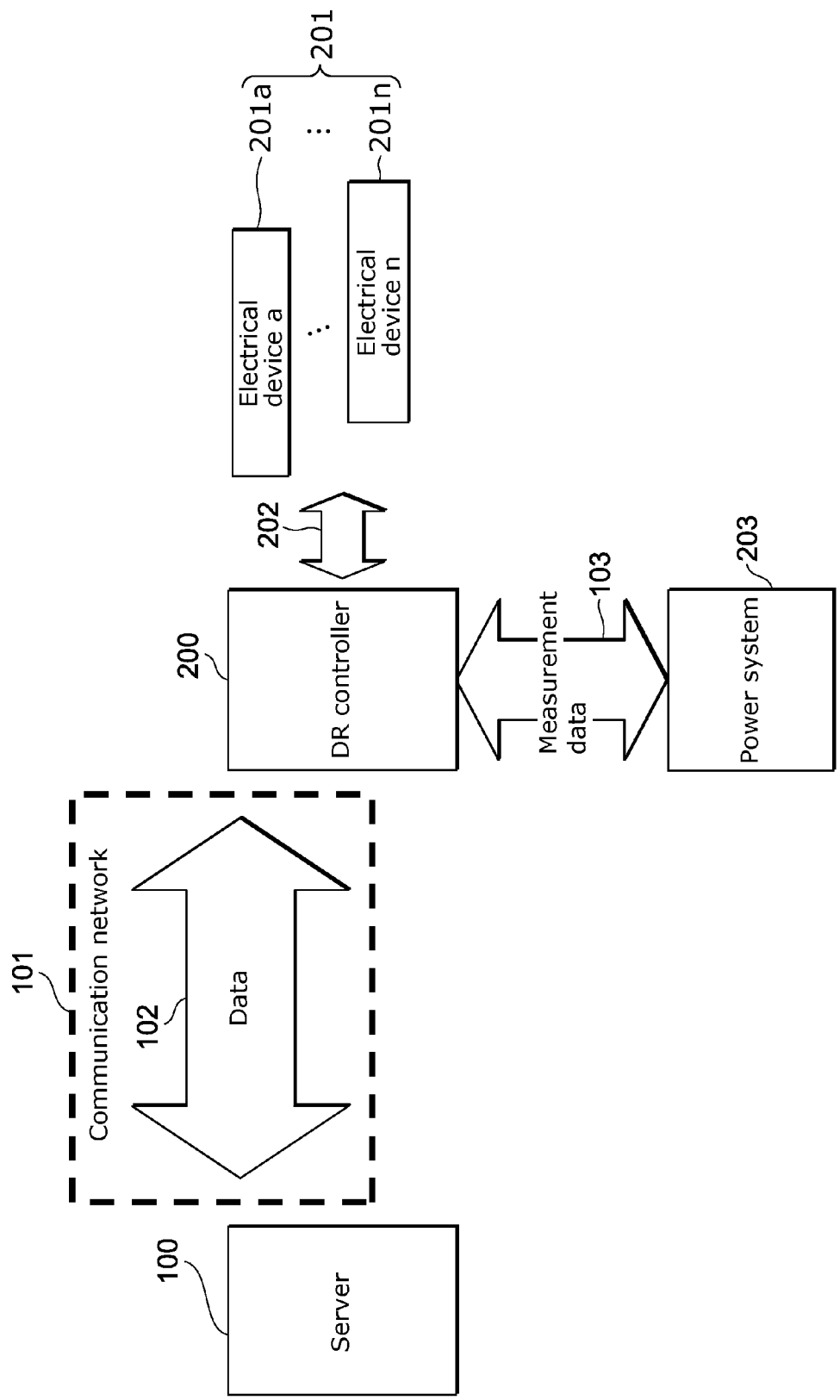
FIG. 2 illustrates the overall configuration of DR control (DR service) according to Embodiment 1.

The following describes a supply and demand control device (DR controller) according to Embodiment 1. The overall configuration of DR control (DR service) will be described. FIG. 2 illustrates an overall configuration of DR control (DR service) according to Embodiment 1.

A system illustrated in FIG. 2 includes a server 100 of a service aggregator (hereinafter, also referred to as server of aggregator (SOA)), a DR controller 200, electrical devices 201a to 201n (hereinafter, also referred to as an electrical device 201). It should be noted that the server 100 may be defined as a first determination system, and the DR controller 200 may be defined as a second determination system.

The server 100 transmits and receives data 102 on the DR control with the DR controller 200 through a communication network 101. The server 100 is controlled by the service aggregator. Here, the service aggregator is, for example, a company which adjusts power supply and demand in response to a request from a company which manages a power system 203, such as a power company. It should be noted that the server 100 may be managed by the company which manages the power system 203.

The DR controller 200 controls the operations of electrical devices 201a to 201n through a communication network 202. Moreover, the DR controller 200 transmits and receives the data 102 with the server 100 through the communication network 101. Therefore, it is possible to control the operations of the electrical devices 201a to 201n, based on the data 102 (a command) received from the server 100. That is, the DR controller 200 can perform conventional order-based DR control.

Moreover, the DR controller 200 can measure the frequency of the power system 203, and control the operations of the electrical devices 201a to 201n based on measurement results. This is the feature of the DR controller 200 which will be detailed later.

The DR controller 200 is managed by a DR provider. The DR provider is, for example, a general customer (user).

Each of the communication networks 101 and 202 is, for example, a wired or wireless communication network, power line communication (PLC), or the Internet.

The electrical devices 201a to 201n are controlled by the DR controller 200. The electrical devices 201a to 201n are, for example, an electrical appliance, an electric vehicle, a battery, a battery charger, a hot-water heater, a refrigeration compressor, a dishwasher, a clothes-dryer, an icemaker, a pump in a pool, and an air conditioner.

The data 102 is, for example, DR contract information, a DR schedule, a power price, and DR start and stop rules based on a value related to the power system 203.

Measurement data 103 is, for example, a frequency, a frequency change rate (FCR) for each predetermined interval, a voltage, and a current in the power system 203.

[Target DR Control]

Figure 3:
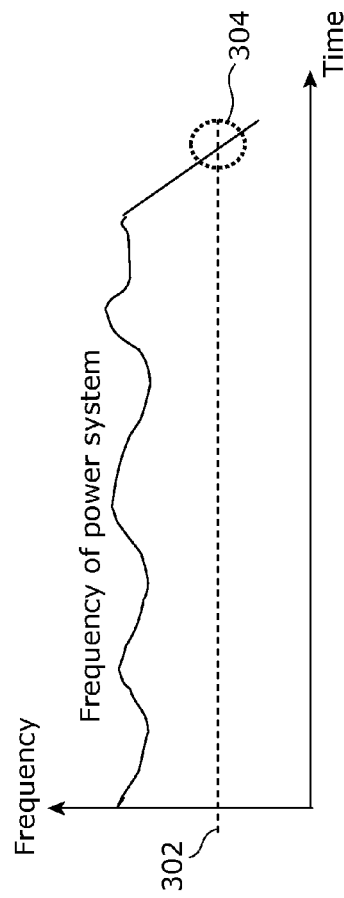
FIG. 3 is a figure for explaining type 1 of order-based DR control.
Figure 4:
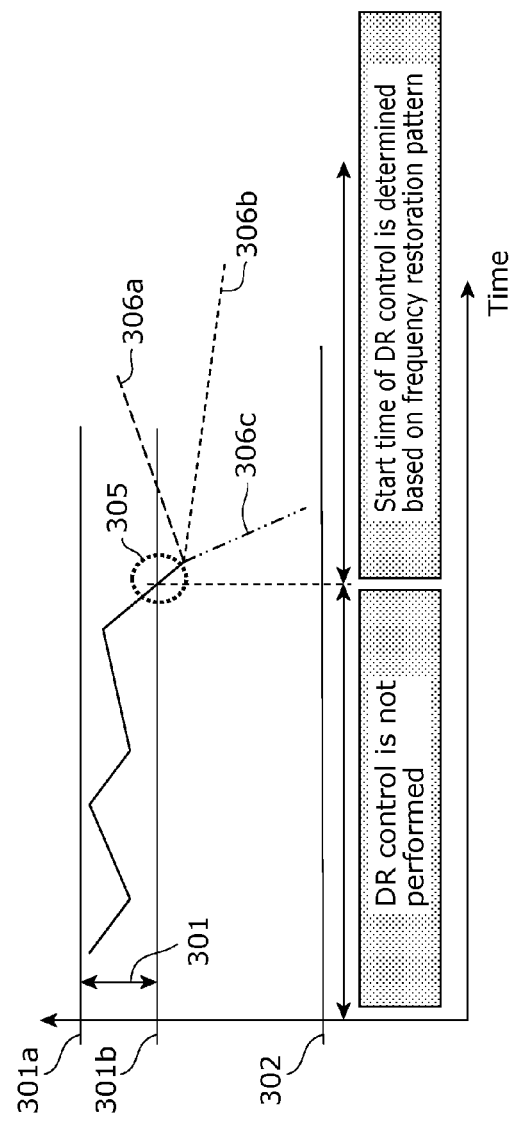
FIG. 4 is a figure for explaining type 2 of order-based DR control.

The following describes the order-based DR control which is main DR control performed by the DR controller 200. FIGS. 3 and 4 are figures for explaining the order-based control which is the main DR control performed by the DR controller 200. FIGS. 3 and 4 illustrate a change in frequency of the power system 203 with a lapse of time.

Command-based DR control is categorized into two types of which type 1 is illustrated in FIG. 3 and type 2 is illustrated in FIG. 4.

In the DR control of type 1 illustrated in FIG. 3, the start time of the DR control is determined based on the comparison of a parameter related to the power system 203 and a predetermined threshold. Specifically, if the instantaneous frequency of the power system 203 falls below a predetermined threshold 302 (at time 304 in FIG. 3), the DR controller 200 must start reducing power consumption by the electrical devices 201a to 201n within a predetermined time since the instantaneous frequency fell below the predetermined threshold 302.

The DR control of type 1 is performed when an emergency occurred in the power system 203, and is called, for example, primary reserve. The predetermined threshold 302 is, for example, set to 99.5% of the reference frequency (commercial power supply frequency) of the power system 203. If the reference frequency is 60 Hz, the predetermined threshold 302 is 59.7 Hz.

Meanwhile, in the DR control of type 2 illustrated in FIG. 4, the start time of the DR control is not determined based on the comparison of a parameter related to the power system 203 and a predetermined threshold. In the DR control of type 2, an operator observes the frequency (or FCR) of the power system 203, and determines the start time of the DR control based on the observation. The determined start time is transmitted from the server 100 to the DR controller 200 as a start command. When the start command is received, the DR controller 200 starts reducing power consumption by the electrical devices 201a to 201n.

Here, in the DR control of type 2, the start time of the DR control is determined as below.

If the frequency of the power system 203 deviates from a predetermined permissible frequency range 301 (at time 305 in FIG. 4), the operator of the power system works on the restoration of the frequency of the power system 203 to within the predetermined permissible frequency range 301 as soon as possible for economic reasons. For instance, after the frequency of the power system 203 deviates from the permissible range, the operator starts a frequency stabilization mechanism.

Moreover, the operator analyzes, for example, the magnitude of an unusual event (e.g., power expected to be deficient [MW]) or the possibility of restoration within a predetermined time, using various kinds of data on the power system 203 (such as instantaneous frequency value, FCR, and the history of frequency restoration pattern). For instance, if the result of the analysis represents that the frequency of the power system 203 may be restored (a pattern 306a in FIG. 4), the start command to start the DR control is not transmitted.

However, if the result of the analysis represents that it takes a long time to restore the frequency of the power system 203 (a pattern 306b in FIG. 4) or that the frequency of the power system 203 may further decrease (a pattern 306c in FIG. 4), the operator determines to start the DR control. That is, the start command to start the DR control is transmitted from the server 100.

The DR control of type 2 is performed by preventing the frequency of the power system 203 from reaching the threshold 302, and is called, for example, secondary reserve. In the DR control of type 2, the permissible frequency range 301 is set to, for example, plus and minus 0.02 of the reference frequency of the power system 203. If the reference frequency is 60 Hz, an upper limit 301a is 60.02 Hz and a lower limit 301b is 59.98 Hz.

As described above, in the DR control of type 2, the operator determines whether or not to start the DR control. Therefore, in the DR control of type 2, the DR controller 200 is required to communicate with the server 100.

Here, if the DR controller 200 can estimate the start time (and end time) of the DR control of type 2, the DR controller 200 does not have to communicate with the server 100. However, as described above, the start time of the DR control of type 2 is not determined by simply observing the frequency of the power system 203.

The DR controller 200 estimates the start time of DR control, when performing DR control as type 2. This allows the DR controller 200 to perform control similar to the DR control of type 2, without communicating with the server 100.

Specifically, if the frequency of the power system 203 falls below the lower limit 301b of the predetermined permissible frequency range 301, the DR controller 200 determines the start time for reducing power consumption by the electrical devices 201a to 201n, based on the rate of change in frequency (the amount of change of frequency per unit time) of the power system 203.

[Detailed Configuration]

Figure 5:
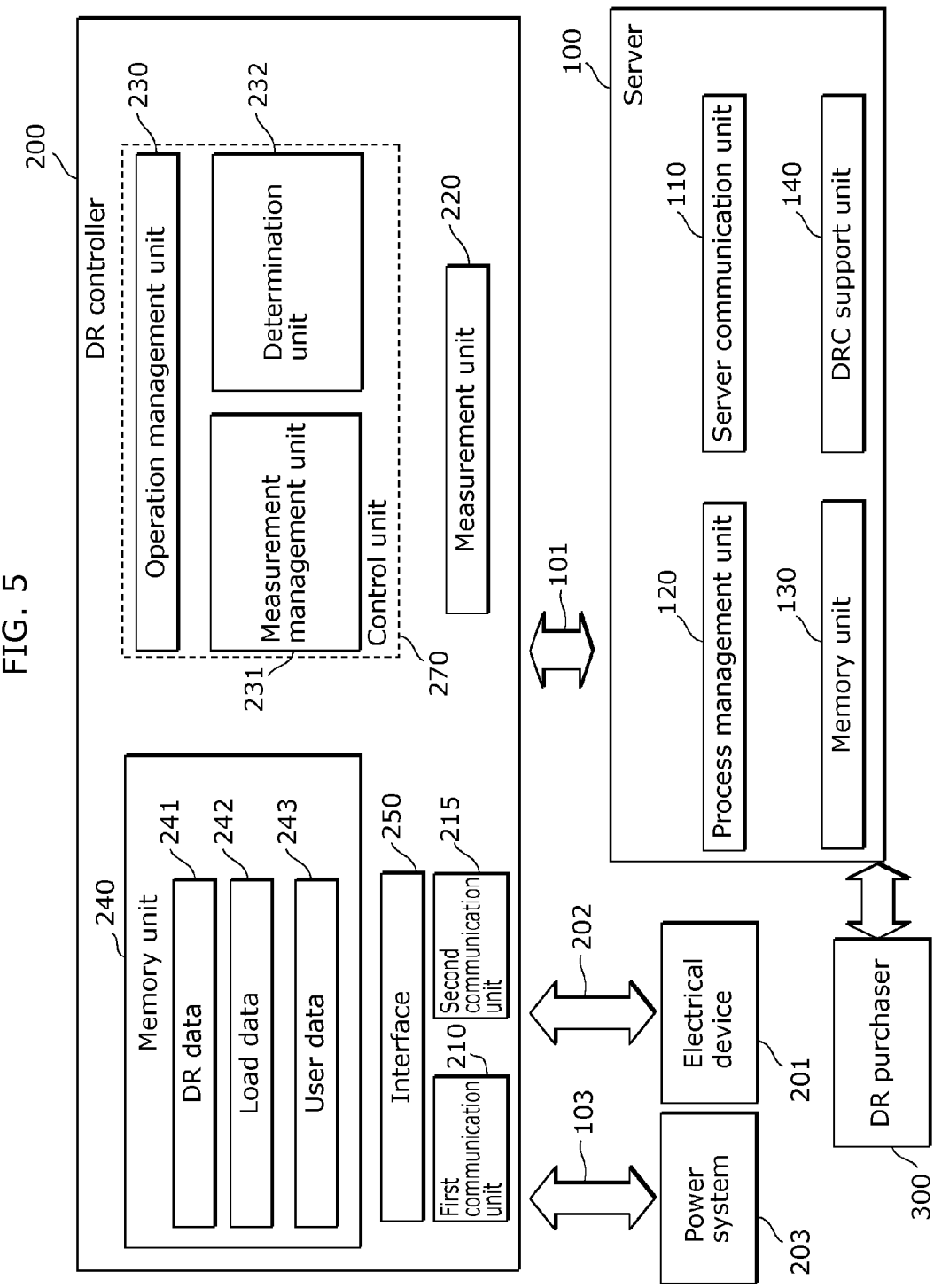
FIG. 5 is a block diagram illustrating functional configurations of a DR controller and a server according to Embodiment 1.

The following describes detailed configurations of the DR controller 200 and the server 100. FIG. 5 is a block diagram illustrating the functional configurations of the DR controller 200 and the server 100.

The DR controller 200 will be described.

As FIG. 5 illustrates, the DR controller 200 includes a first communication unit 210, a second communication unit 215, a measurement unit 220, a control unit 270 (an operation management unit 230, a measurement management unit 231, and a determination unit 232), and a memory unit 240. Moreover, as FIG. 5 illustrates, the DR controller 200 may include an interface 250.

It should be noted that the electrical device 201 illustrated in FIG. 5 belongs to the same customer, and operates using a power from the power system 203 (consumes the power from the power system 203). Here, the customer means a unit such as a housing or apartment.

The first communication unit 210 is a communication module for communicating with the electrical device 201 via the communication network 202. Wi-Fi (registered trademark), home area network (HAN), Zigbee (registered trademark), and others are used as the communication network 202. The DR controller 200 can transmit switch-on and switch-off commands to the electrical device 201 via the first communication unit 210, to control the electrical device 201.

The second communication unit 215 is a communication module for transmitting and receiving the data 102 with the server 100 through the communication network 101.

The operation management unit 230 performs DR control. Specifically, the operation management unit 230, for example, transmits a DR command (a control signal) to the electrical device 201 via the first communication unit 210, observes and modifies the operation of each of the electrical device 201 under the DR control, and manages data.

The measurement management unit 231 determines, for example, the format of the measurement data 103 and a measuring duration, and gives a measurement instruction and obtains the measurement data 103. The measurement management 231 obtains, for example, the frequency of the power system 203 measured by the measurement unit 220. It should be noted that the measurement data 103 obtained by the measurement management unit 231 includes measurement data measured by a device different from the DR controller, such as a management device for managing the power system 203. The measurement data 103 represents, for example, the instantaneous frequency of the power system 203 or the FCR during a predetermined time of the power system 203, a voltage, a time, or others.

The measurement unit 220 measures the frequency of the power system 203 at predetermined time intervals (i.e., every predetermined time cycle), based on the instruction from the measurement management unit 231. It should be noted that the measurement unit 220 may be provided outside the DR controller 200. For instance, the electrical device 201 may include the measurement unit 220, or the measurement unit 220 may be achieved as an independent device.

The determination unit 232 determines the start time (activation time) of the DR control and the end time of the DR control (time to start restoration), using information received from other block such as the measurement management unit 231. The determination unit 232 determines, for example, the start time and end time of the DR control, in addition to whether to start or end the DR control. The determined start time and end time are transmitted to the operation management unit 230 for operation management.

The memory unit 240 is, for example, a memory device such as a semiconductor memory or a ferroelectric random access memory. The memory unit 240 stores DR data 241, load data 242, and user data 243.

The DR data 241 includes, for example, DR contract context data, DR operation history data, and data representing the frequency value (grid value) of the power system 203.

The user data 243 includes, for example, user's set value, user's DR settings, and user's DR operation data for each load (electrical device 201).

The load data 242 includes, for example, context data, an energy residual quantity, a temperature, and an operation point in each load.

The interface 250 receives an input from a user.

The server 100 will be described below.

As FIG. 2 illustrates, the server 100 includes a server communication unit 110, a process management unit 120, a memory unit 130, and a DRC support unit 140.

The server 100 (service aggregator) provides more than one DR purchaser 300 with a DR service. Here, typical DR purchasers 300 are companies which manage the power system 203. The companies which manage the power system 203 may, as service aggregators, manage the server 100 and adjust power supply and demand. That is, the DR purchasers 300 and the service aggregators may be the same.

The server communication unit 110 transmits and receives data with, for example, a management device for managing the power system 203 and the DR controller 200. The server communication unit 110 transmits data to, for example, more than one DR controller including the DR controller 200.

The process management unit 120 performs processing related to the operation of DR aggregation such as scheduling, execution, and billing.

The memory unit 130 is, for example, a memory device such as a semiconductor memory or a ferroelectric random access memory. The memory unit 130 stores information representing, for example, a DR contract with a customer (content of DR control), a technical requirement in each DR contract, a frequency, a power price, and a DR contract with the DR purchaser 300.

The DRC support unit 140 makes DR operation data or basic rules. The basic rules are transmitted to the DR controller 200 (the second communication unit 215) through the communication network 101. The determination unit 232 of the DR controller 200 determines (estimates) a start time and an end time, using the received basic rules.

The basic rules include, for example, information on the state of a DR determined by the value of the instantaneous frequency of the power system 203 and the state of the DR determined by a FCR value. Moreover, the basic rules include information representing the permissible frequency range 301 and the predetermined threshold 302.

It should be noted that the basic rules may be prestored in the memory unit 240 of the DR controller 200.

It should be noted that the DR controller 200 may modify the basic rules using the DR operation history data, the user data 243, the load data 242, and others included in the DR data 241.

It should be noted that the server 100 may upload, for example, an updatable source code, software, an identifier, and a database to the DR controller 200. This allows the DR controller 200 itself to calculate the above basic rules.

It should be noted that the DRC support unit 140 can provide the DR controller 200 with estimated information including an estimated value for a DR control duration and estimated start and end times.

[Operation]

Figure 6:
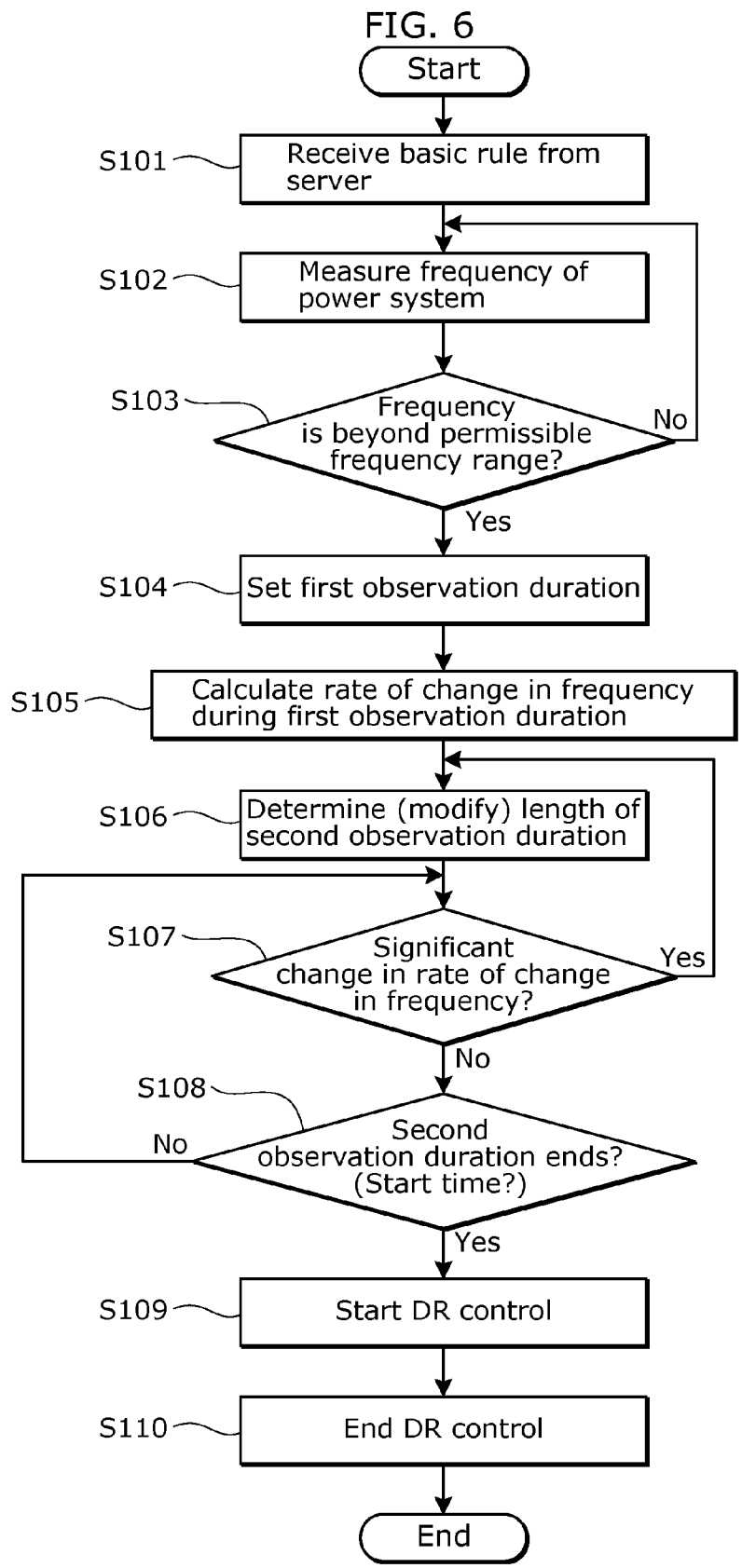
FIG. 6 is a flowchart illustrating the operation of determining the start time of DR control by the DR controller according to Embodiment 1.

The following describes the operation of determining a start time of DR control by the DR controller 200. FIG. 6 is a flowchart illustrating the operation of determining the start time of the DR control performed by the DR controller 200. It should be noted that the control illustrated in the flowchart of FIG. 6 is also referred to as observation control in the following.

Steps S101 to S103 in FIG. 6 will be described.

The second communication unit 215 of the DR controller 200 receives the basic rules (or a source code, software, an identifier, a database, or others) from the server 100 (S101). It should be noted that if the basic rules are prestored in the memory unit 240, step S101 can be omitted.

The measurement unit 220 of the DR controller 200 measures the instantaneous frequency of the power system 203 (S102). The measurement management unit 231 obtains the frequency of the power system 203 measured by the measurement unit 220. It should be noted that basically the frequency of the power system 203 is successively measured and obtained at predetermined time intervals.

The determination unit 232 determines whether or not the frequency obtained by the measurement management unit 231 (measured by the measurement unit 220) is beyond the permissible frequency range 301 (S103). If the frequency falls within the permissible frequency range 301 (No in S103), the frequency measurement processing in step S102 is continued. If the frequency is beyond the permissible range (Yes in S103), the processing of determining the start time of DR control is started.

It should be noted that the determination unit 232 may bias the permissible frequency range 301 in view of an error by the measurement unit 220. In this case, the determination unit 232 calculates and adjusts the error by the measurement unit 220. That is, in the determination in step S103, the determination unit 232 may add a margin to the permissible frequency range 301 in view of the measurement error.

It should be noted that the permissible frequency range 301 is determined for each DR contract, and differs by each contract. In general, different power systems 203 (DR purchasers 300) to be under DR control have different permissible frequency ranges 301 in many cases.

The frequency obtained by the measurement management unit 231 (measured by the measurement unit 220) is beyond the permissible frequency range 301 (Yes in S103), the determination unit 232 determines that an unusual event has occurred in the power system 203, and sets a first observation duration (S104). The first observation duration is also referred to as base observation duration (BOD) in the following.

[Settings of BOD]

The settings of the BOD in step S104 in FIG. 6 will be described in detail below.

Figure 7:
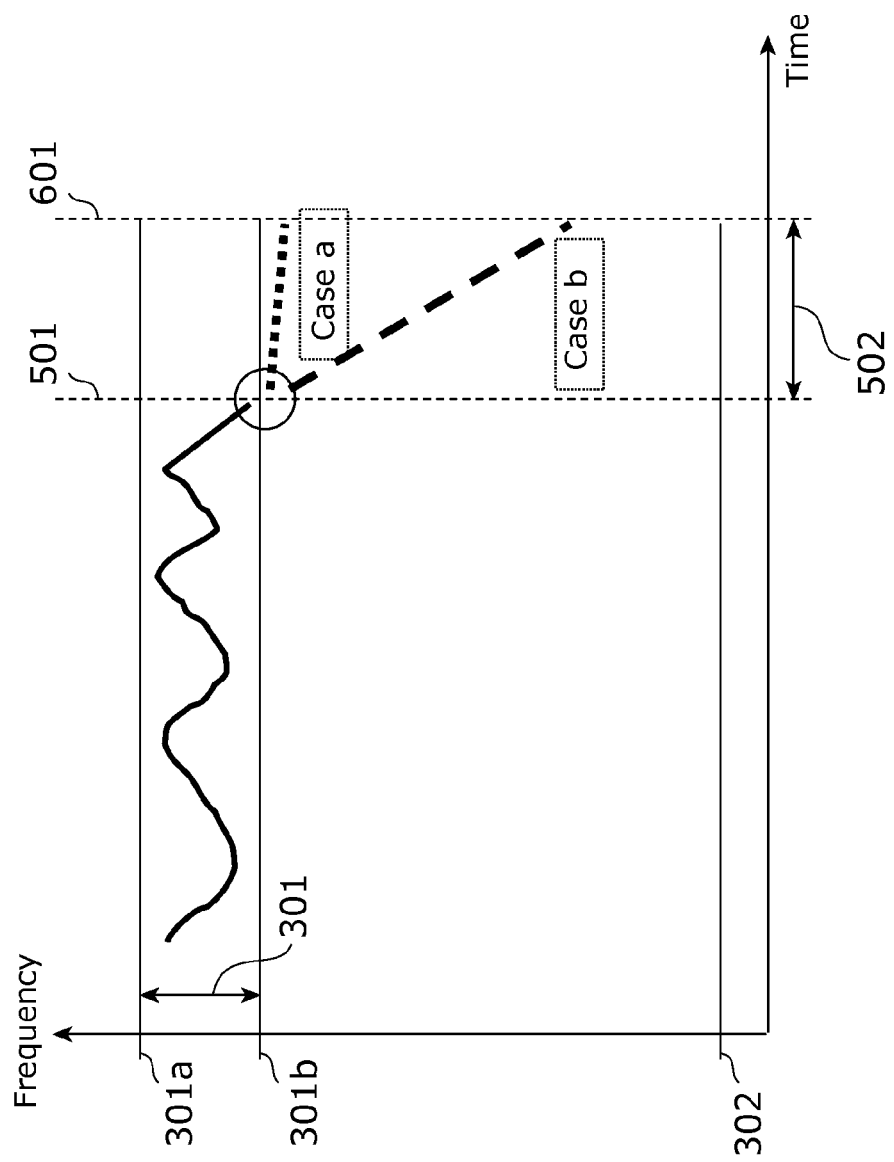
FIG. 7 is a figure for explaining a base observation duration (BOD).
Figure 8:
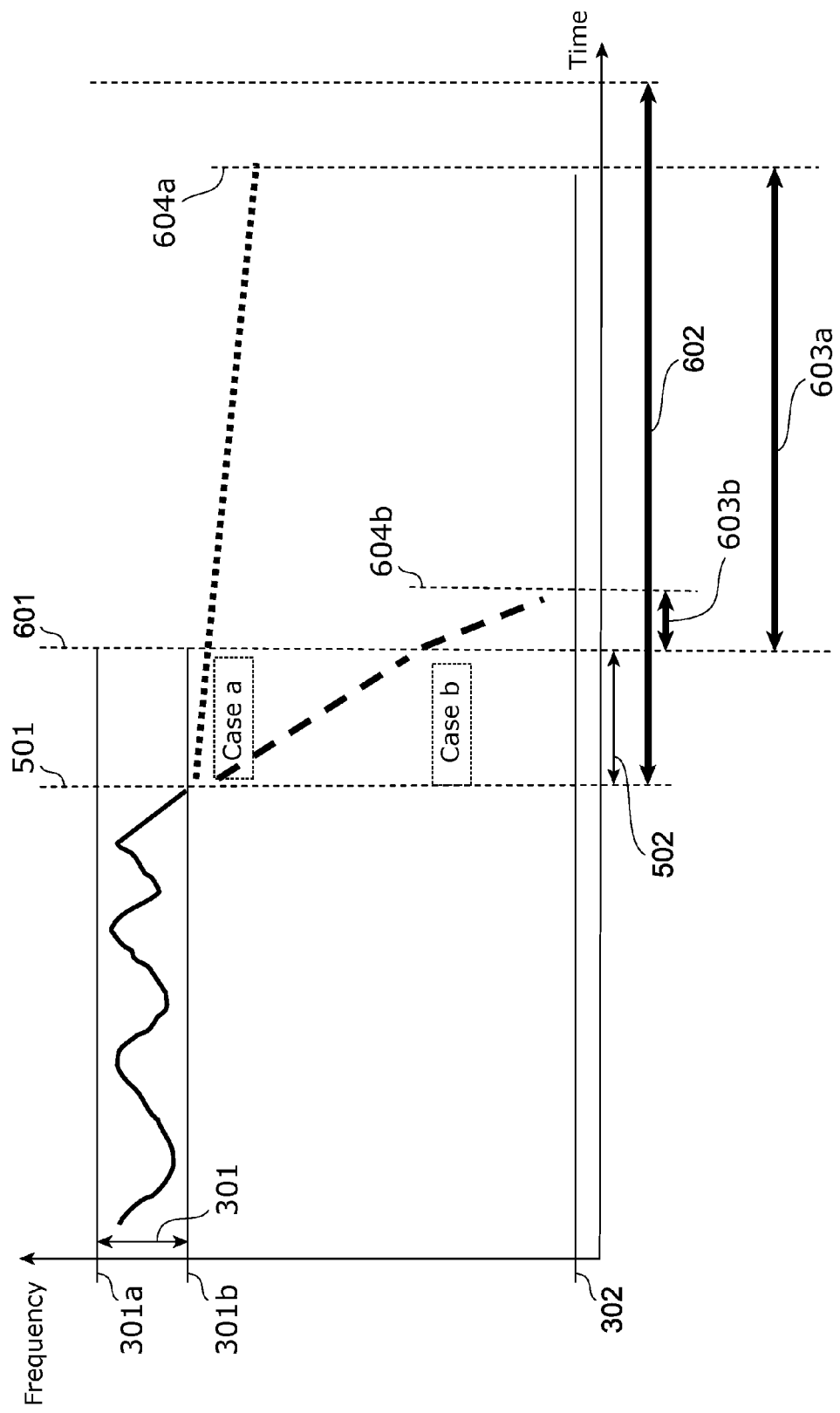
FIG. 8 is a figure for explaining an observation duration for judgment (ODJ).

FIGS. 7 and 8 are figures for explaining the BOD. As FIGS. 7 and 8 illustrate, a BOD 502 is duration immediately after an unusual event occurred in the power system 203 (after the frequency of the power system 203 is beyond the permissible frequency range 301). In FIG. 7, a time 501 is the time when the frequency of the power system 203 is beyond the permissible frequency range 301.

The BOD 502 is set based on at least one of the pieces of information below.

1. DR contract data

In general, a duration within which the DR controller 200 must start DR control after a DR start requirement for each DR contract is satisfied is determined in DR contract data. FIG. 8 illustrates this duration as the longest duration 602. The BOD 502 is set to a shorter duration than the longest duration 602. It should be noted that the longest duration 602 may be included in the basic rules.

2. DR contract scheduled to be executed by the DR controller 200 For instance, the BOD 502 is set to be shorter than the shortest one of the longest time periods 602 respectively set for DR contracts scheduled to be executed. This is to secure, for any DR contract, a sufficient time until the DR control is started.

3. Time intervals at which the DR control is performed, determined by load (electrical device 201) context data 4. Basic rule It should be noted that the BOD may be a predetermined duration. That is, unlike the flowchart of FIG. 6, the BOD does not have to be dynamically set. In this case, step S104 in FIG. 6 is omitted.

[Estimation of Magnitude of Unusual Event]

Step S105 in FIG. 6 will be described in detail below.

Following step S104, the determination unit 232 calculates the rate of change in frequency during BOD 502, to estimate the magnitude of an unusual event (S105). Here, the rate of change in frequency during the BOD 502 (hereinafter, also referred to as reference change rate) represents the rate of change between a frequency obtained at the start time of BOD 502 and a frequency obtained at the end time of the BOD 502.

Moreover, the determination unit 232 estimates a frequency lowering amount which is determined based on the magnitude (MWh) of each unusual event. During an unusual event, the DR controller 200 can calculate estimation data representing the frequency lowering amount, from the unusual-event history data of a power system (the power system 203) and the instantaneous frequency profile of the power system 203.

The unusual-event history data of the power system can be received from, for example, the server 100, the operator of the power system, or a database on the Internet (e.g., unusual event information provided on a website by the operator of the power system). The frequency profile of the power system 203 during the unusual event may be received by a similar method. Alternatively, the history of instantaneous frequency data stored in the memory unit 240 may be used as the frequency profile.

Possible lowering of the frequency of the power system 203 is calculated, for example, in the following expression, based on the magnitude (MWh) of each unusual event.

[Math. 1]

$$Avg\left(\frac{\text{Frequency drop (Hz)}}{\text{unusual event amount (MW)}}\right) \quad \text{(Expression 1)}$$

The determination unit 232 obtains a function as shown in the above, from the magnitude of an unusual event and the lowering amount of the frequency of the power system 203. The components of this function can be updated based on the state of the power system 203.

The determination unit 232 estimates the magnitude of an unusual event during the BOD 502, based on the FCR calculated as above. The determination unit 232 calculates the severity level of the unusual event during the BOD 502.

It should be noted that in step S105 in FIG. 6, at least the rate of change in frequency (a reference frequency rate) during the BOD 502 may be calculated.

It should be noted that in Embodiment 1, if the instantaneous frequency of the power system 203 falls below the predetermined threshold 302 during the BOD, the determination unit 232 determines to start the DR control. Based on the determination, the operation management unit 230 starts reducing power consumption by the electrical device 201 via the first communication unit 210. That is, if the frequency obtained during the BOD falls below the predetermined threshold 302 which is less than the lower limit of the predetermined permissible frequency range 301, the control unit 270 further performs control in which the power consumption by the electrical device 201 is reduced via the first communication unit 210. This control corresponds to DR control called primary reserve described above.

[Determination of ODJ]

Step S106 in FIG. 6 will be described in detail below.

The determination unit 232 determines the length of a second observation duration, depending on at least the above reference change rate (S106). The second observation duration is a duration for observing a parameter (such as FCR) of the power system 203 and judging whether or not to start the DR control. The second observation duration is also referred to as observation duration for judgment (ODJ) below.

It should be noted that an observation duration (the total duration of the BOD and ODJ) is, in other words, a duration during which the DR control is deferred. If the frequency of the power system 203 does not return to within the predetermined permissible frequency range 301 during the observation duration, the DR control is started when the observation duration ends (at the start time of the DR control).

Meanwhile, if the frequency of the power system 203 returns to within the predetermined permissible frequency range 301 within the observation duration, the DR control (the reduction of power consumption by the electrical device 201) scheduled to start at the start time is basically canceled (is not started). That is, the shorter the ODJ is determined to be, the higher the possibility that the DR control is started. The longer the ODJ is determined to be, the lower the possibility that the DR control is started.

It should be noted that inertia in the power system 203 may be taken into account when the ODJ is determined.

The determination unit 232 determines the ODJ based on at least one of the pieces of information below.

1. FCR during the BOD 502
2. Measurement data of the power system 203 (such as instantaneous frequency at end time of BOD, i.e., start time of ODJ (at time 601) or FCR)
3. Estimated magnitude of unusual event and severity level of unusual event during the BOD 502
4. DR contract data (such as data during the longest duration 602)
5. DR contract scheduled to be executed by the DR controller 200
6. Time intervals at which DR control is performed, determined by load (the electrical device 201) context data
7. Basic rule
8. Time which has elapsed since occurrence of unusual event (the time 501) (for example, the following points are taken into account: how many seconds the BOD 502 continued, delay, and time when unusual event occurred)

Moreover, the determination unit 232 determines the ODJ so that the above factors and the ODJ have relationships below.

"The FCR in the BOD" in the above has the following relation with the length of the ODJ. The determination unit 232 determines the ODJ to be a shorter duration as the FCR in the BOD represents a more abrupt decrease (larger decrease) in frequency. This is because, as described above, the shorter the ODJ, the higher the possibility that the DR control is performed.

Likewise, the "estimated magnitude of an unusual event and severity level" in the BOD has the following relation with the length of the ODJ. The determination unit 232 determines the ODJ to a shorter duration as the magnitude of the unusual event is greater and the severity level is higher.

Likewise, "the instantaneous frequency at the end time of the BOD, i.e., the start time of the ODJ" has the following relation with the length of the ODJ. The determination unit 232 determines the ODJ to be a shorter duration as the instantaneous frequency at the time 601 is lower. This is because the lower the instantaneous frequency at the time 601, the higher the possibility that the frequency of the power system 203 reaches the predetermined threshold 302 and the DR control is started.

Likewise, the longest duration 602 is directly associated with the ODJ. This is because the DR control needs to be started within the longest duration 602.

Most typically, the determination unit 232 determines the length of the ODJ based on "the FCR during the BOD 502" among the pieces of information. Specifically, the determination unit 232 determines the ODJ to be a shorter duration as the FCR during the BOD represents a more abrupt decrease in frequency. That is, the determination unit 232 determines the start time of the DR control to be an earlier time as the FCR during the BOD represents a more abrupt decrease in frequency. With reference to FIG. 8, a typical example of determining the ODJ will be described below.

The FCR during the BOD in "case b" illustrated in FIG. 8 represents a decrease in frequency which is far more abrupt than that in "case a". Therefore, as FIG. 8 illustrates, an ODJ 603a determined in "case a" is longer than an ODJ 603b determined in "case b". That is, as FIG. 8 illustrates, a start time 604a of the DR control determined in "case a" is later than a start time 604b determined in "case b".

It should be noted that the determination unit 232 may determine the ODJ to be a shorter duration as the value of the FCR of the power system 203 is lower (smaller). In this case, the FCR of positive value represents an increase in frequency while the FCR of negative value represents a decrease in frequency.

It should be noted that in Embodiment 1, if the instantaneous frequency of the power system 203 falls below the predetermined threshold 302 during the ODJ, the determination unit 232 determines to start the DR control. Based on the determination, the operation management unit 230 starts reducing power consumption by the electrical device 201 via the first communication unit 210. That is, if the frequency obtained during the ODJ falls below the predetermined threshold 302 which is less than the lower limit of the predetermined permissible frequency range 301, the control unit 270 further performs control in which the power consumption by the electrical device 201 is reduced via the first communication unit 210. This control corresponds to DR control called primary reserve described above.

Moreover, if the FCR during the BOD represents an increase in frequency, the determination unit 232 does not have to determine the start time, and the operation management unit 230 does not have to start reducing the power consumption by the electrical device 201. This is because if the FCR during the BOD represents an increase in frequency, there is the high possibility that the frequency of the power system 203 returns to within the permissible frequency range 301 that is, there is no need to perform the DR control).

[Modification of ODJ]

Step S107 in FIG. 6 will be described in detail below.

Figure 9:
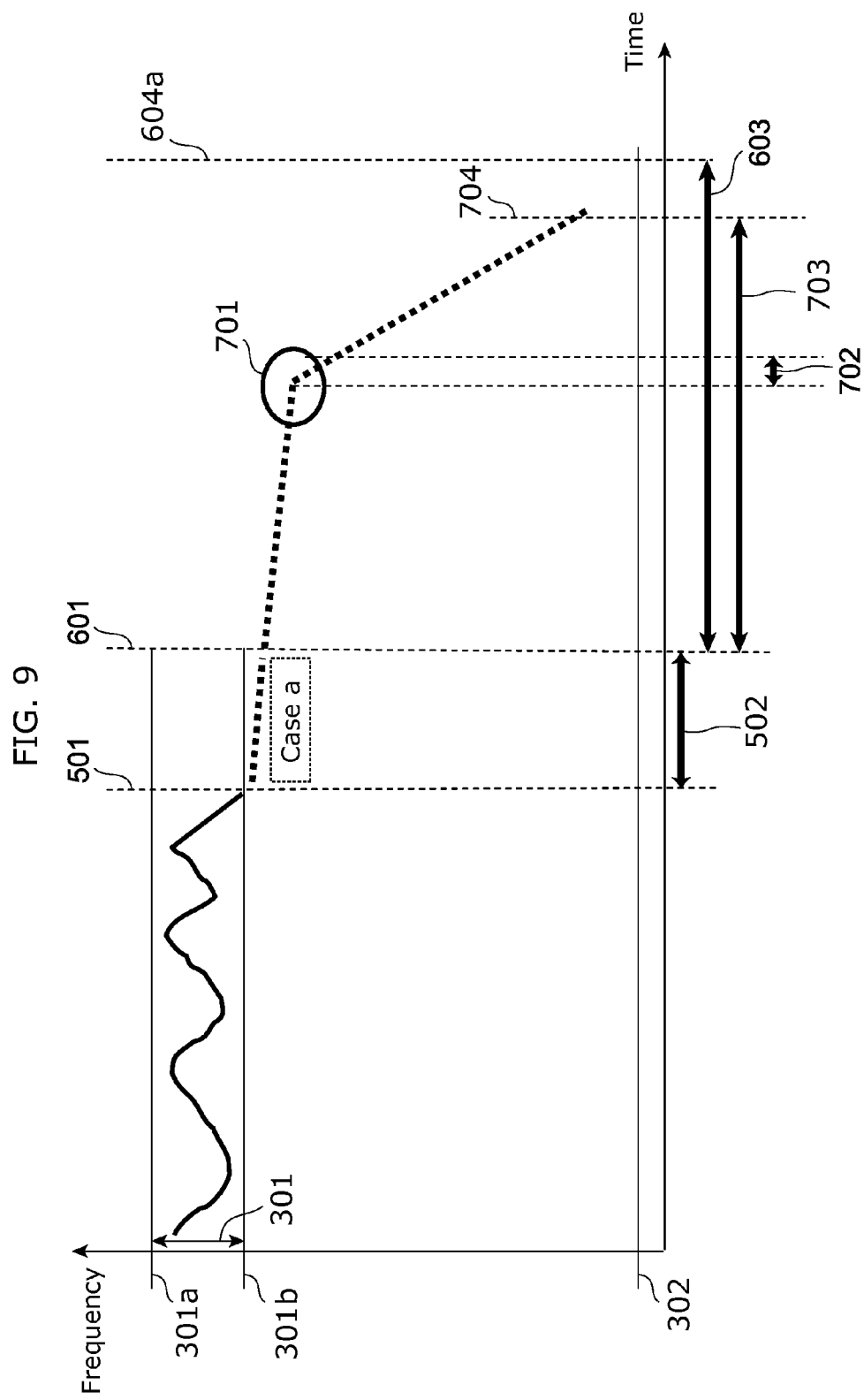
FIG. 9 is a figure for modifying the ODJ.

The FCR may significantly change during the ODJ, depending on the state of the power system 203. Therefore, if the FCR significantly changes (Yes in S107), the determination unit 232 modifies the length of the ODJ (S106). FIG. 9 is a figure for explaining the modification of the ODJ.

In the example in FIG. 9, the determination unit 232 calculates the FCR every predetermined number of seconds 702. Here, if a significant change 701 in FCR (a significant decrease in frequency) occurs in the predetermined number of seconds 702, the ODJ is modified.

The significant change 701 in FCR occurs due to the occurrence of a problem in the power system after the occurrence of an unusual event (after the time 501). For instance, a deficiency in a generator activated in an unusual event for supplying auxiliary power or the restoration of the generator which had the deficiency is considered the above problem. In addition, for example, an abrupt decrease or increase in frequency in the power system 203 based on a change in voltage or load in the power system 203 is considered the above problem. The occurrence of such secondary problem should be taken into account in determining the start of the DR control.

Specifically, whether it is the significant change 701 in FCR is determined based on, for example, whether or not the FCR changes by a % or more in b second(s). Here, a and b are predefined values. For instance, a change in FCR by 50% or more in five seconds means a significant change in FCR.

When the significant change 701 occurs in FCR, the determination unit 232 determines whether or not to modify the ODJ using the longest duration 602 as an upper limit.

In the example in FIG. 9, a first determined ODJ 603 is too long in view of the significant change 701 in FCR (i.e., "a significant decrease in frequency" or "a significant decrease in FCR"). Therefore, the determination unit 232 modifies (shortens) the ODJ from the ODJ 603 to an ODJ 703. That is, the determination unit 232 advances the start time from the start time 604a to a start time 704. This advances the determination of the start of the DR control, and decreases the possibility that a problem is caused in the safety of the power system 203.

Thus, in Embodiment 1, if the rate of change in frequency obtained during the ODJ represents a decrease in frequency which is more abrupt (significant) than the rate of change in the BOD, the determination unit 232 shortens the length of the ODJ. It should be noted that if the rate of change in frequency obtained during the ODJ represents a more moderate decrease in frequency than the rate of change in frequency during the BOD, or represents an increase in frequency, the determination unit 232 may extends the length of the ODJ

[Determination of Start of DR Control]

Steps S108 and S109 in FIG. 6 will be described in detail below.

The measurement management unit 231 obtains measurement data such as FCR during the ODJ. After the ODJ ends (Yes in S108), the determination unit 232 determines to start the DR control. Based on the determination, the operation management unit 230 starts reducing power consumption by the electrical device 201 via the first communication unit 210. That is, the operation management unit 230 starts the DR control (S109).

As described above, the DR control is, as a rule, started if the frequency of the power system 203 does not return to within the predetermined permissible frequency range 301 by the end of the ODJ (the start time). However, the determination unit 232 may determine at least one of the start time of the DR control and the reduction amount of power consumption by the electrical device 201, using at least one of the pieces of information below.

1. FCR during ODJ
2. Estimated magnitude and severity level of unusual event
3. Load (electrical device 201) context data
4. DR contract data
5. Basic rule Moreover, the determination unit 232 may, for example, determine the start time of the DR control and the reduction amount of the power consumption by the electrical device 201 as below. It should be noted that in the following expressions, "DO DR" means that the DR control is started while "NO DR" means that the DR control is not started. "Amount" is the reduction amount of the power consumption by the electrical device 201.

[Math. 2]
unusual event amount < A
FCR (ODJ) < 0            DO DR    Amount =X (MW)
0<FCR (ODJ) <"value C"   NO DR    Amount =0
...
if FCR (ODJ)> "value D"  NO DR    Amount =0
A< unusual event amount <B
FCR (ODJ) < 0            DO DR    Amount=X+Y (MW)
0<FCR (ODJ) <"value E"   DO DR    Amount=X+Y+Z (MW)
...
if FCR (ODJ)> "value F"  NO DR    Amount =0

In the above expressions, the reduction amount of the power consumption by the electrical device 201 is directly associated with the lowering of the frequency of the power system 203.

It should be noted that the DR controller 200 has a learning ability, and may modify the start time of the DR control. For instance, the DR controller 200 (the control unit 270) prestores, in the memory unit 240, the history of a start command sent by the operator of the power system. The DR controller 200 then compares the start time indicated by the stored start command with the start time determined by the DR controller 200. The DR controller 200 may, for example, modify the start time of the DR control (the length of the ODJ), based on a difference between the start times.

Moreover, a penalty imposed when the DR control is not started at appropriate timing is prescribed in the DR contract information. Therefore, if a penalty for, for example, non-performance of the DR control is prescribed, the DR controller 200 increases "value E" or "value F" in the above expressions to reduce the possibility that a penalty is imposed.

[Determination of End of DR Control]

Step S110 in FIG. 6 will be described in detail below.

After the DR control is started, the operation management unit 230 of the DR controller 200 ends (stops) the DR control, based on the determination by the determination unit 232 (S110).

Conditions where the DR control is ended are generally prescribed in the DR contract information. The DR contract information is included in the DR data 241 stored in the memory unit 240. It should be noted that the DR contract information is included in the basic rules transmitted from the server 100.

For instance, in the DR control for supplying reserve, the conditions where the DR control is ended are that the instantaneous frequency of the power system 203 returns to within the permissible frequency range 301 and that a predetermined time (e.g., 30 seconds) has elapsed since the DR control was started. It should be noted that the measurement unit 220 measures the instantaneous frequency of the power system 203, and the measurement management unit 231 measures a time which has elapsed since the DR control was started. The determination unit 232 determines the end time of the DR control based on results of these measurements, and the operation management unit 230 ends the reduction of the power consumption by the electrical device 201, based on the determination.

CONCLUSION

The DR controller 200 according to Embodiment 1 was described above. The DR controller 200 performs the observation control which is DR control corresponding to reserve supply, without receiving a command from the server 100.

In this observation control, if the obtained frequency falls below the lower limit of the predetermined permissible frequency range 301, the control unit 270 starts the observation control. In the observation control, the control unit 270 determines the start time for reducing power consumption by the electrical device 201 via the first communication unit 210, based on the rate of change in frequency obtained after the observation control is started (after the time 501). If the frequency obtained during the observation duration, which is a duration from the start of the observation control (the time 501) to the start time, does not return to within the permissible frequency range 301, the control unit 270 starts reducing power consumption by the electrical device 201 at the start time.

This allows the DR controller 200 to start the DR control at appropriate timing without using a communications infrastructure. Moreover, the DR controller 200 can reduce a risk such as blackout due to, for example, an accident in the power system 203. This can decrease the possibility that the power consumption by the electrical device 201 is unnecessarily reduced.

Embodiment 2

According to the observation control by the DR controller 200 described in Embodiment 1, it is possible to perform the DR control of type 2 illustrated in FIG. 4, without communication with the server 100. The above observation control may be performed when the communication with the server 100 is cut off, for example. The following describes Embodiment 2 where such situation is assumed.

Figure 10:
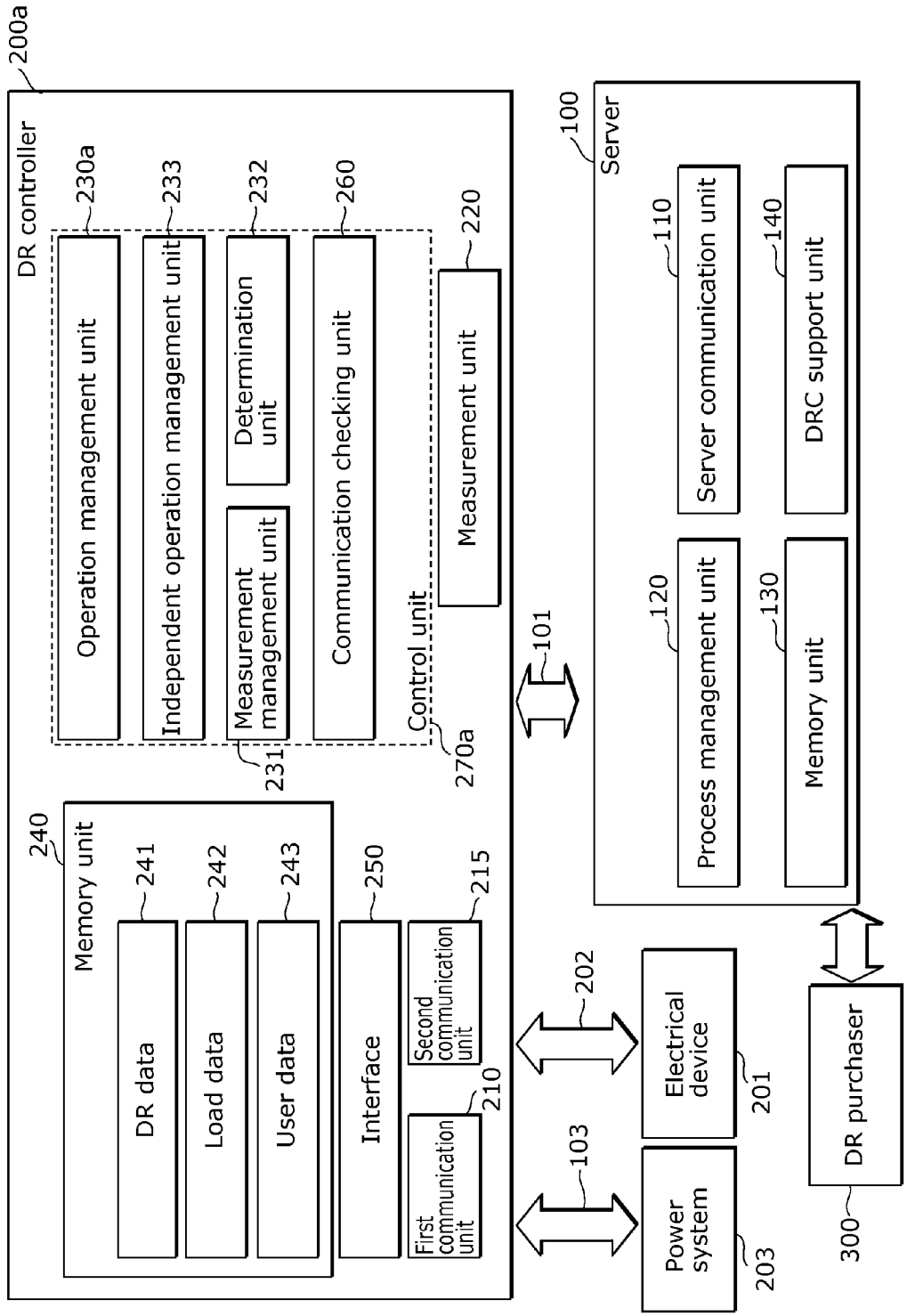
FIG. 10 is a block diagram illustrating functional configurations of a DR controller and a server according to Embodiment 2.
Figure 11:
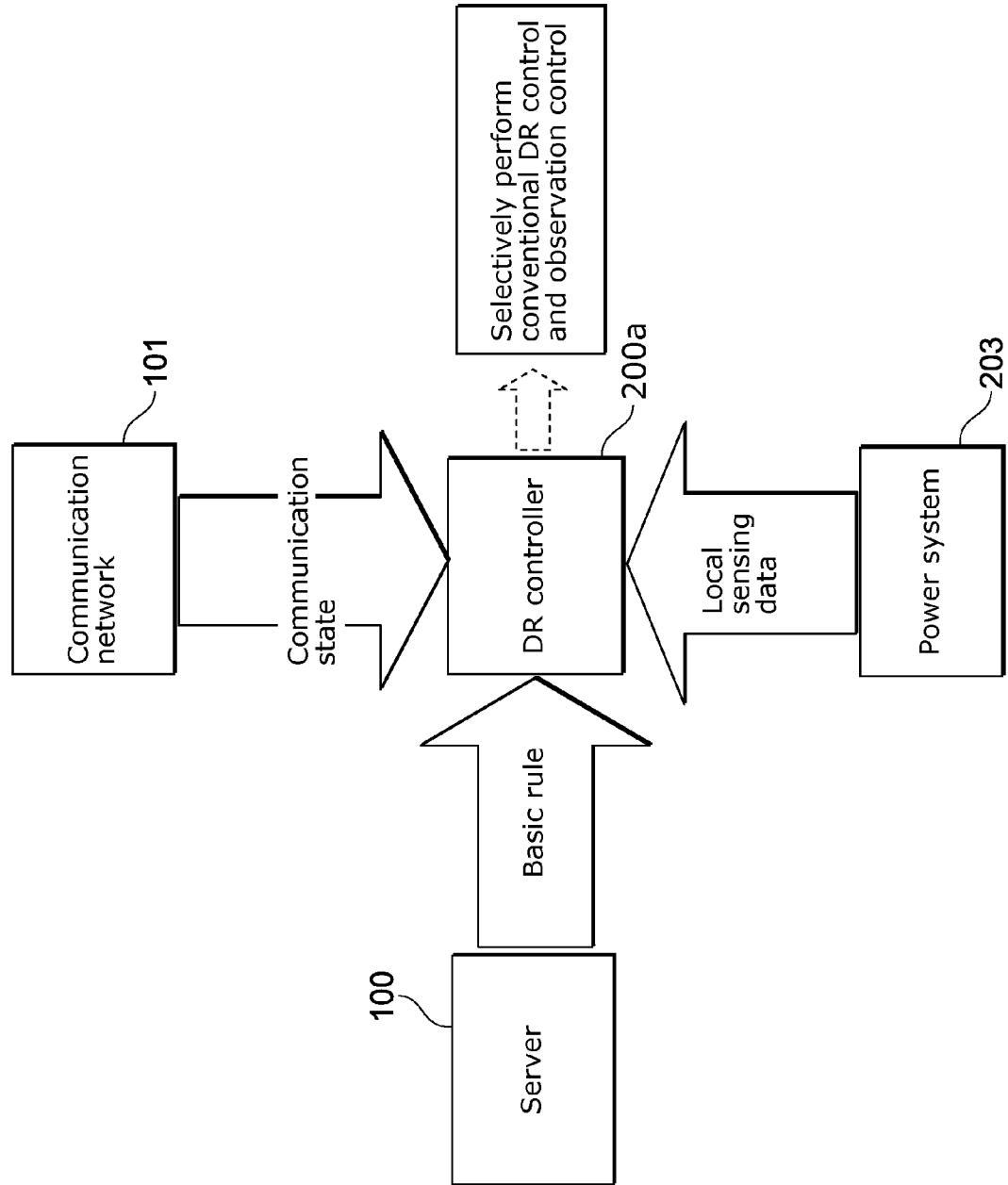
FIG. 11 is a conceptual scheme of DR control according to Embodiment 2.

FIG. 10 is a block diagram illustrating functional configurations of a DR controller and a server 100 according to Embodiment 2. FIG. 11 is a conceptual scheme of DR control according to Embodiment 2. It should be noted that the following description mainly focuses on differences from Embodiment 1.

As FIG. 10 illustrates, unlike the DR controller 200, a control unit 270a in a DR controller 200a according to Embodiment 2 further includes an independent operation management unit 233 and a communication checking unit 260. Moreover, an operation by an operation management unit 230a of the DR controller 200a is different from an operation by a corresponding unit of the DR controller 200.

Moreover, as the conceptual scheme in FIG. 11 illustrates, the DR controller 200a obtains basic rules from the server 100, and measures the frequency of a power system 203. This is the same as Embodiment 1. However, unlike the DR controller 200, the communication checking unit 260 in the DR controller 200a checks the state of the communication network 101, and selectively performing conventional DR control and the observation control described in Embodiment 1. Further details will be described below.

In Embodiment 2, start and end commands for the DR control are as conventionally transmitted from the server 100 to the DR controller 200a to perform the DR control as illustrated in type 2 in FIG. 4. Here, the communication checking unit 260 determines whether or not normal communication has been performed (i.e., whether or not a communication network 101 is cut off, or whether or not a communication state is deteriorated).

If the normal communication has been performed, the DR controller 200a as conventionally performs the DR control in accordance with the start and end commands transmitted from the server 100. Specifically, if the communication checking unit 260 determines that the normal communication has been performed, the operation management unit 230a starts (finishes) reducing power consumption by the electrical device 201, based on the start command (the end command) transmitted from the server 100.

Meanwhile, if the normal communication has not been performed, the independent operation management unit 233, instead of the operation management unit 230a, starts or finishes reducing the power consumption by the electrical device 201, based on the observation control described in Embodiment 1. If the communication checking unit 260 determines that the communication network 101 has been restored, the operation management unit 230a performs the conventional DR control.

Figure 12:
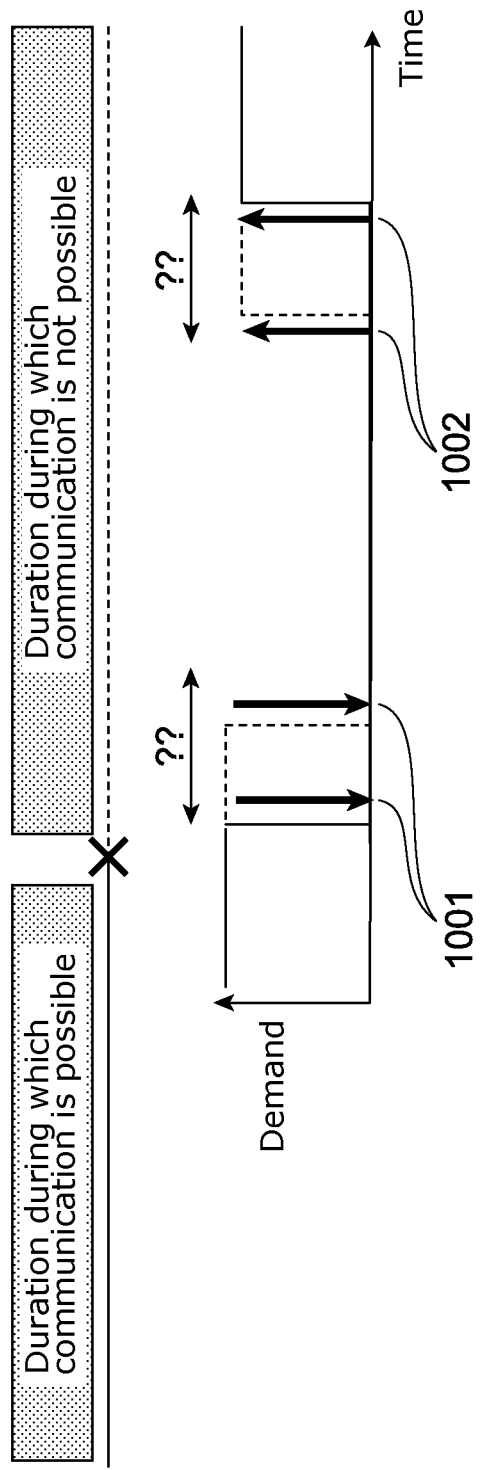
FIG. 12 is a figure for explaining type 2 of order-based DR control performed when a communication state is not normal.

The DR control as illustrated in type 2 in FIG. 4 which is the main DR control performed by the DR controller 200a as described above is categorized into order-based DR control. In the order-based DR control, if the normal communication has not been performed, it is not possible to clearly determine a start time 1001 and an end time 1002 of the DR control as illustrated in FIG. 12.

However, even if the normal communication has not been performed, it is technically and economically preferable for the operator of a power system, the manager of the server 100 (service aggregator), and the owner of the DR controller 200a that the DR control be not interrupted.

Therefore, in Embodiment 2, even if the normal communication has not been performed, the DR controller 200a continues the DR control using the independent operation management unit 233.

Figure 13:
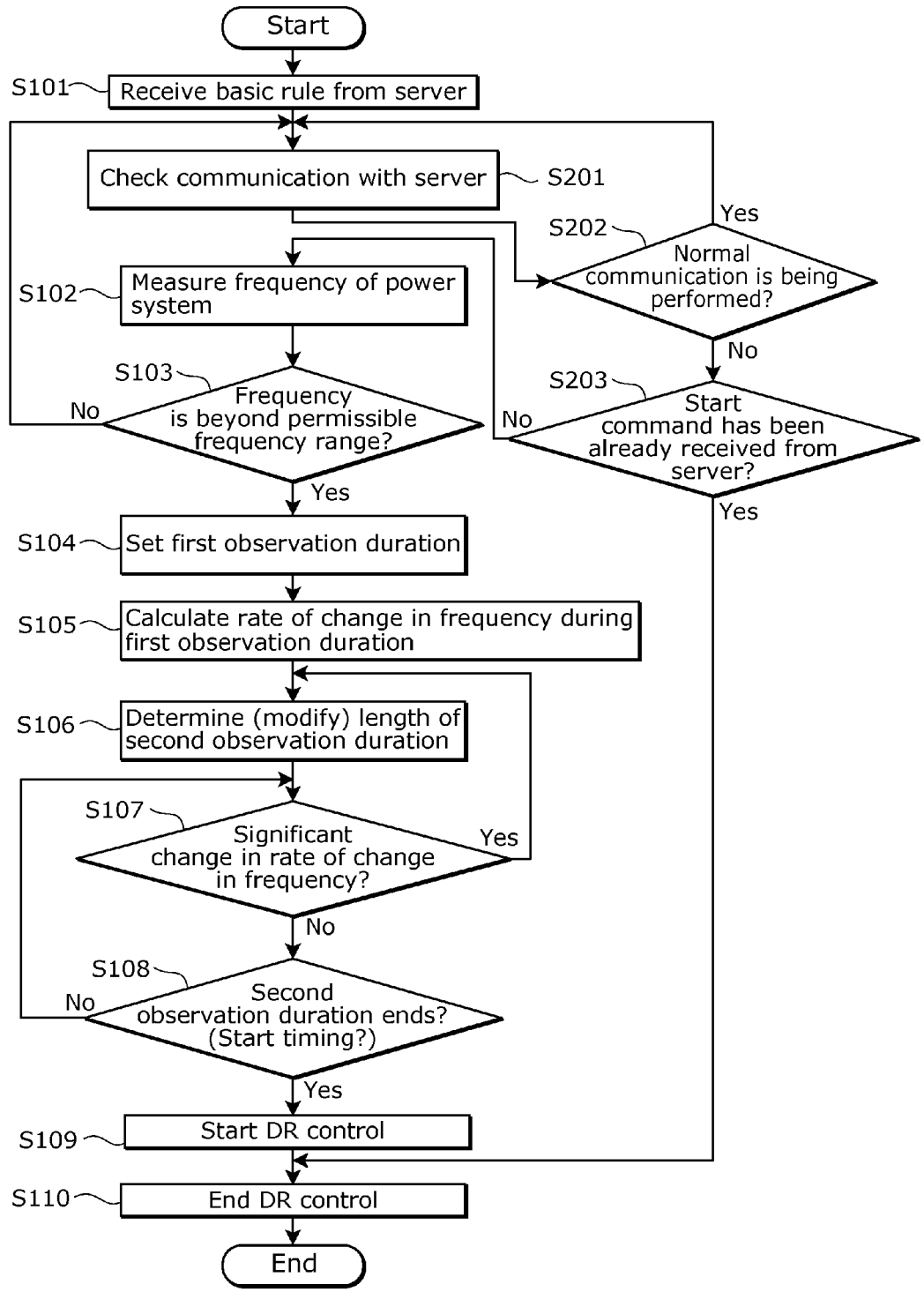
FIG. 13 is a flowchart of operation by the DR controller according to Embodiment 2.

The following describes the operation of the DR controller 200a according to Embodiment 2. FIG. 13 is a flowchart illustrating the operation of the DR controller 200a. Unlike the flowchart in FIG. 6, the flowchart in FIG. 13 includes steps S201 to S203 focused on by the following description.

After a second communication unit 215 receives basic rules from the server 100 (S101), the communication checking unit 260 determines whether or not normal communication is being performed between the second communication unit 215 and the server 100 (S201 and S202).

It should be noted that determination as to whether or not the normal communication is being performed is based on, for example, the bit error rate (BER) of a signal received by the second communication unit 215. If the BER is not greater than a predetermined value, the normal communication is determined to be performed. If the BER is greater than the predetermined value, the normal communication is determined not to be performed.

If the normal communication is being performed between the second communication unit 215 and the server 100 (Yes in S202), the processing goes back to step S201. Thus, if the processing of step S201 and step S202 is repeated, a communication state is good. Therefore, the conventional DR control is performed in accordance with the start and end commands. This DR control is performed by the operation management unit 230a.

If the communication network 101 is cut off between the second communication unit 215 and the server 100 and normal communication is not being performed (No in S202), the communication checking unit 260 checks whether or not the second communication unit 215 has already received the start command from the server 100 (S203).

If the second communication unit 215 has already received the start command, i.e., the DR control has been already started (Yes in S203), the determination unit 232 determines, as with Embodiment 1, the end time of the DR control, based on a time which has elapsed since the DR control was started and the measurement value of the frequency of the power system 203. The independent operation management unit 233 finishes reducing the power consumption by the electrical device 201, based on the determination (S110).

Meanwhile, if the second communication unit 215 has not yet received the start command in step S203 (No in S203), measurement of the frequency of the power system 203 is started, and subsequently, the observation control described in Embodiment 1 is performed (S102 to S110). It should be noted that in this case, the independent operation management unit 233 performs the start of reduction of the power consumption by the electrical device 201 in step S109 and the end of reduction of the power consumption by the electrical device 201 in step S110.

It should be noted that although not illustrated in FIG. 13, after the processing of step S109, if the communication checking unit 260 determines that the state of the communication network 101 has been restored, the operation management unit 230a performs the DR control. That is, in Embodiment 2, if the communication network 101 is in a good condition, the operation management unit 230a is used in preference to the independent operation management unit 233. That is, if the communication network 101 is in a good condition, the conventional DR control is performed in preference to the observation control described in Embodiment 1.

As described above, the control unit 270a in the DR controller 200a according to Embodiment 2 (i) reduces the power consumption by the electrical device 201, depending on a command (power supply and demand adjustment instruction) which the second communication unit 215 receives from the server 100, and (ii) performs the observation control described in Embodiment 1 if communication is cut off between the second communication unit 215 and the server 100.

This allows the DR controller 200a to continue the DR control even if the communication state is deteriorated.

Other Embodiment

The present invention is not limited to the above embodiments.

The above embodiments describe control by a DR controller performed if the frequency of the power system 203 falls below the lower limit 301b of the permissible frequency range 301. However, the DR controller can perform control based on similar concept even if the frequency of the power system 203 is greater than the upper limit 301a of the permissible frequency range 301.

Moreover, the observation control described above may be performed in combination with other DR control. For instance, the observation control may be performed in combination with FR control.

It should be noted that in the above embodiments, main DR control performed by the DR controller mainly is DR control as illustrated in type 2 in FIG. 4. However, the DR controller may also perform DR control to be introduced in the future and other control.

In the above embodiments, the determination unit 232 determines the start time of the DR control, based on the rate of change in frequency (df/dt) in the power system 203. However, the determination unit 232 may determine the start time of the DR control, based on the second order derivative of the frequency ($d^2f/dt^2$) of the power system 203.

It should be noted that in each embodiment described above, each structural element may be achieved by dedicated hardware or achieved by executing a software program suitable for each structural element. Each structural element may be achieved by a program execution unit such as a CPU or a processor reading and executing a software program recorded on a recording medium such as a hard disk or a semiconductor memory.

It should be noted that the above embodiments describe the examples of the observation control in which two durations represented as the first and second observation durations are provided. However, the present invention also includes the case where only one observation duration is provided.

In this case, the control unit 270, for example, obtains the frequency of the power system 203, and sets the observation duration for observing the frequency of the power system 203 if the obtained frequency falls below the lower limit of the predetermined permissible frequency range 301. The control unit 270 determines whether or not to reduce power consumption by the electrical device 201, depending on the rate of change in frequency obtained during the observation duration.

Specifically, if the rate of change in frequency obtained during the observation duration is likely to return to within the permissible frequency range 301, the control unit 270 suspends the reduction of the power consumption by the electrical device 201. If the rate of change in frequency obtained during the observation represents a decrease, the control unit 270 starts reducing the power consumption by the electrical device 201 at the end time of the observation duration.

It should be noted that here, "the rate of change in frequency obtained during the observation" means the rate of change between a frequency obtained at the start time of the observation duration and a frequency obtained at the end time of the observation duration. Moreover, "the case where the rate of change is likely to return to within the permissible frequency range 301" is, for example, the case where the rate of change represents an increase or status quo in frequency or the case where the rate of change represents a decrease in frequency but the degree of the decrease is small (i.e., the rate of change is lower than a predetermined value). Moreover, "the case where the rate of change represents a decrease in frequency" is, for example, the case where the rate of change represents a decrease in frequency or the case where the rate of change represents a decrease in frequency and the degree of the decrease is large (i.e., the rate of change is not less than the predetermined value).

Even in such observation control, the DR controller can start reducing the power consumption by the electrical device 201 at more appropriate timing than when simply comparing the permissible frequency range 301 and an obtained frequency.

The supply and demand control devices (supply and demand control methods) according to one or more exemplary embodiments were described above based on the embodiments. However, the present invention is not limited to these embodiments. The one or more exemplary embodiments may include, without departing from the scope of the present invention, an embodiment achieved by making various modifications which those skilled in the art would conceive to the above embodiments or an embodiment achieved by combining the structural elements in the different embodiments.

It should be noted that the structural elements described in the appended drawings and detailed description include not only structural elements necessary for solving the problems but also structural elements which are inessential for solving the problems but are introduced to exemplify the above technology. Therefore, these inessential structural elements should not be immediately regarded as essential elements simply because these inessential structural elements are illustrated in the appended drawings or described in the detailed description.

The present invention is applicable to a supply and demand control device for adjusting power supply and demand between a power system and a customer.

REFERENCE SIGNS LIST 100 server
101 and 202 communication network
102 data
110 server communication unit
120 process management unit
130 and 240 memory unit
140 DRC support unit
200 and 200a DR controller (supply and demand control device)
201, 201a to 201n electrical device
203 power system
210 first communication unit
215 second communication unit
220 measurement unit
230 and 230a operation management unit
231 measurement management unit
232 determination unit
233 independent operation management unit
241 DR data
242 load data
243 user data
250 interface
270 and 270a control unit
300 DR purchaser
301 permissible frequency range
301a upper limit
301b lower limit
302 predetermined threshold
304, 305, and 601 time
306a to 306c pattern
501 time
502 first observation duration (BOD)
603, 603a, 603b, and 703 second observation duration (ODJ)
604a, 604b, 704, and 1001 start time
701 change
702 predetermined number of seconds
1002 end time

The invention claimed is:

1. A supply and demand control device for controlling power supply and demand between a power system and a customer, the supply and demand control device comprising:
a first communication circuit that communicates, via a communication network, with an electrical device which belongs to the customer and consumes power from the power system; and
a controller that obtains a frequency of the power system, and starts observation control if the obtained frequency falls below a lower limit of a predetermined permissible frequency range,
wherein in the observation control, the controller
obtains a rate of change in the frequency of the power system after the observation control is started,
determines a start time for reducing power consumption of the electrical device via the first communication circuit, using the rate of change in frequency obtained after the observation control is started, and
starts reducing the power consumption at the start time if the obtained frequency does not return to within the predetermined permissible frequency range within an observation duration which is a duration from start of the observation control to the start time.

2. The supply and demand control device according to claim 1,
wherein the controller determines the start time to be an earlier time as the rate of change represents a more abrupt decrease in frequency.

3. The supply and demand control device according to claim 1,
wherein the observation duration includes a first observation duration and a second observation duration subsequent to the first observation duration, and
the controller determines a length of the second observation duration, depending on a reference change rate, and determines an end time of the second observation duration to be the start time, the reference change rate being the rate of change between a frequency obtained at a start of the first observation duration and a frequency obtained at an end of the first observation duration.

4. The supply and demand control device according to claim 3,
wherein the controller determines the second observation duration to be a shorter duration as the reference change rate represents a more abrupt decrease in frequency.

5. The supply and demand control device according to claim 3,
wherein if a rate of change in frequency obtained during the second observation duration represents a more abrupt decrease in frequency than the reference change rate, the controller shortens the second observation duration.

6. The supply and demand control device according to claim 1,
wherein if the rate of change represents an increase in frequency, the controller does not determine the start time and not reduce the power consumption.

7. The supply and demand control device according to claim 1, further comprising
a second communication circuit that communicates with a server,
wherein the controller
(i) reduces the power consumption depending on a power supply and demand adjustment instruction which the second communication circuit receives from the sever, and
(ii) starts the observation control if communication is cut off between the second communication circuit and the sever and the obtained frequency falls below the lower limit of the predetermined permissible frequency range.

8. The supply and demand control device according to claim 1,
wherein if the obtained frequency returns to within the predetermined permissible frequency range within the observation duration, the controller cancels reduction of the power consumption scheduled to start at the start time.

9. The supply and demand control device according to claim 1,
wherein if the obtained frequency falls below a predetermined threshold within the observation duration, the predetermined threshold being less than the lower limit of the predetermined permissible frequency range, the controller is further performs control in which the power consumption of the electrical device is reduced via the first communication circuit, the control being different from the observation control.

10. The supply and demand control device according to claim 1, further comprising
a measurer that measures a frequency of the power system,
wherein the controller obtains the frequency of the power system measured by the measurer.

11. A supply and demand control method for controlling power supply and demand between a power system and a customer, the supply and demand control method comprising:
communicating, via a communication network, with an electrical device which belongs to the customer and consumes power from the power system; and
obtaining a frequency of the power system, and starting observation control if the obtained frequency falls below a lower limit of a predetermined permissible frequency range, and
obtaining a rate of change in the frequency of the power system after the observation control is started,
wherein in the observation control,
start time for reducing power consumption of the electrical device via the communication is determined using the rate of change in frequency obtained after the observation control is started, and
the reduction of the power consumption is started at the start time if the obtained frequency does not return to within the predetermined permissible frequency range within an observation duration which is a duration from start of the observation control to the start time.

12. A supply and demand control device for controlling power supply and demand between a power system and a customer, the supply and demand control device comprising:
a first communication circuit that communicates, via a communication network, with an electrical device which belongs to the customer and consumes power from the power system; and
a controller that obtains a frequency of the power system, and starts observation control if the obtained frequency exceeds an upper limit of a predetermined permissible frequency range, and obtains a rate of change in the frequency of the power system after the observation control is started,
wherein in the observation control, the controller
determines start time for increasing power consumption of the electrical device via the first communication circuit, using the rate of change in frequency obtained after the observation control is started, and
starts increasing the power consumption at the start time if the obtained frequency does not return to within the predetermined permissible frequency range within an observation duration which is a duration from start of the observation control to the start time.

* * * * *